INVENTOR.
S.C.CARNEY

INVENTOR.
S. C. CARNEY

Patented Dec. 16, 1952

2,622,115

UNITED STATES PATENT OFFICE 2,622,115

SEPARATION OF EUTECTIC-FORMING MIXTURES BY CRYSTALLIZATION METHODS

Samuel C. Carney, Bartlesville, Okla., assignor to Phillips Petroleum Company, a corporation of Delaware Application May 23, 1949, Serial No. 94,849

9 Claims. (Cl. 260—707)

This invention relates to a continuous process for separating binary mixtures, the components of which are completely miscible in the liquid phase and completely immiscible in the solid phase. In a more specific aspect, it relates to a continuous process for the separation of binary mixtures of organic compounds, the components of which are completely miscible in the liquid phase and completely immiscible in the solid phase. In another specific aspect, it relates to a continuous process for resolving a eutectic-forming mixture of organic compounds into its components. In still another aspect, it relates to an apparatus for effecting the type of separations just described.

In my copending application, Serial No. 68,461, filed December 31, 1948, I have described a process and apparatus for separating binary mixtures which are completely miscible in the liquid phase and only partially miscible in the solid phase. Solid solutions are examples. If the components are immiscible in the solid phase, the separation requires additional apparatus and process steps over that described in said copending application.

In separating binary mixtures by crystallization, if each of the components becomes completely saturated with respect to the other, further abstraction of heat will crystallize both components as a heterogeneous solid. This is ordinarily referred to as a eutectic mixture. If one of the components of a eutectic-forming mixture is present in excess of the eutectic ratio, the mixture will, on cooling, become saturated with that component first and the amount in excess of the eutectic ratio can be removed in substantially pure form. The original mixture is thus separated into two fractions, a solid comprising the excess saturating component, that is, the amount by which the saturating component exceeds the eutectic ratio. The other fraction is the mother liquor approximating the eutectic composition. I have described the process and apparatus for making such a separation in my previously-mentioned copending application.

Now I have developed a process and apparatus for effecting the continuous separation of binary eutectic mixture, wherein I make use of the apparatus described in said copending application. The first step of my process is to remove the excess saturating component, if one of the components is present in excess of the eutectic ratio. To the mother liquor fraction approximating the eutectic composition, I add a third liquid component, or diluent, which, in the liquid phase, is completely miscible with both components of the eutectic mixture. This ternary mixture has a ternary eutectic point at which each component is saturated with respect to the other two.

Because of individual differences between the original components of the mixture, which will be more fully explained later, the addition of the third component does not produce the same freezing point lowering in each component. After the addition of the third component to the eutectic mixture, further removal of heat will crystallize some of that component whose freezing point was lowered the least. In this step, the ternary mixture is separated into one substantially pure fraction comprising the excess saturating component and another fraction approximating the binary eutectic composition for the ternary mixture and the added diluent. The diluent is then removed by distillation. This leaves a binary mixture of the original components, one of which is present in excess of the eutectic ratio. The component which is now saturated with respect to the other is that component which was the saturating component of the ternary mixture. This excess saturating component is then removed by solidifying and removing as described for the first step. This results in one fraction comprising the excess saturating component in substantially pure form and another fraction approximating the eutectic composition. By continuous repetition of the process just described, it is possible to effect complete separation of the original binary mixture into its components.

When I say that I separate a binary eutectic, I do not necessarily mean that the eutectic mixture as such is separated without the aid of other components. I mean that I begin with a binary eutectic mixture or a binary mixture whose components have a eutectic composition and end up with the components in substantially pure form.

The principal object of my invention is to provide a continuous process for the separating of binary mixtures, the components of which are completely miscible in the liquid phase and completely immiscible in the solid phase.

Another object is to provide an apparatus for separating such binary mixtures.

Another object is to provide a process for obtaining in substantially pure form the components of a binary mixture of organic components which are completely miscible in the liquid phase and completely immiscible in the solid phase.

Another object is to provide a process for separating binary eutectic-forming mixtures of organic compounds.

Other objects and advantages of my invention will be apparent to those skilled in the art from reading the following drawings, disclosure and claims.

Figure 1:
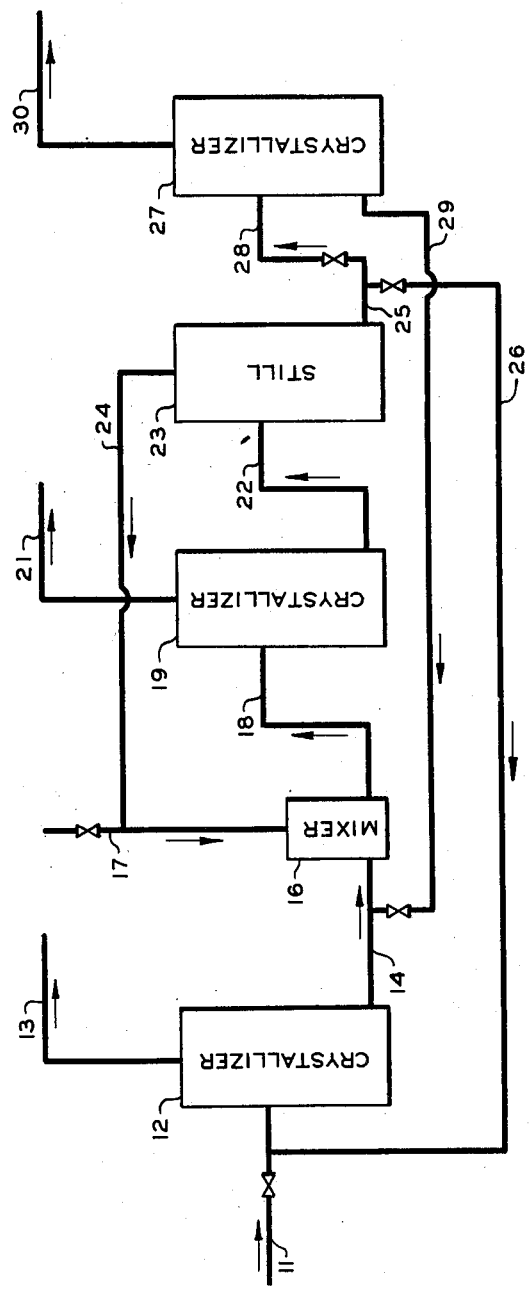
Figure 1 is a flow sheet showing the steps of a process by which a binary mixture such as I have described may be separated into its components.

In Figure 1, the binary mixture to be separated is introduced through line 11 into crystallizer 12 where it is separated into one fraction comprising the excess saturating component, which is removed through line 13 and another fraction approximating the eutectic composition, which is passed through line 14 into mixer 16, where it is mixed with a third component or diluent introduced through line 17. This ternary mixture is removed from mixer 16 through line 18 to a second crystallizer 19 where it is separated into one fraction comprising the excess saturating component in substantially pure form, which is removed through line 21 and another fraction approximating the binary eutectic composition for the ternary mixture. This is removed through line 22 to a distillation zone 23, where it is separated into two fractions, one of which comprises the diluent which has been previously added, which is now removed through line 24 and returned to mixing zone 16 via line 17. The other fraction from distillation zone 23 is a mixture of the original two components with one of the components being present in excess of the eutectic ratio. This mixture is removed from distillation zone 23 through line 25 and, depending on its composition, is either returned to crystallizer 12 via lines 26 and 11 or is passed into a third crystallizer 27 via line 28, as will be explained hereafter. If it goes into crystallizer 27, the mixture is separated into two fractions, one of which comprises the then excess saturating component in substantially pure form, which is removed through line 30. The other comprises a binary mixture approximating the eutectic composition, which fraction is passed through line 29 and line 14 into mixer 16.

Figure 2:
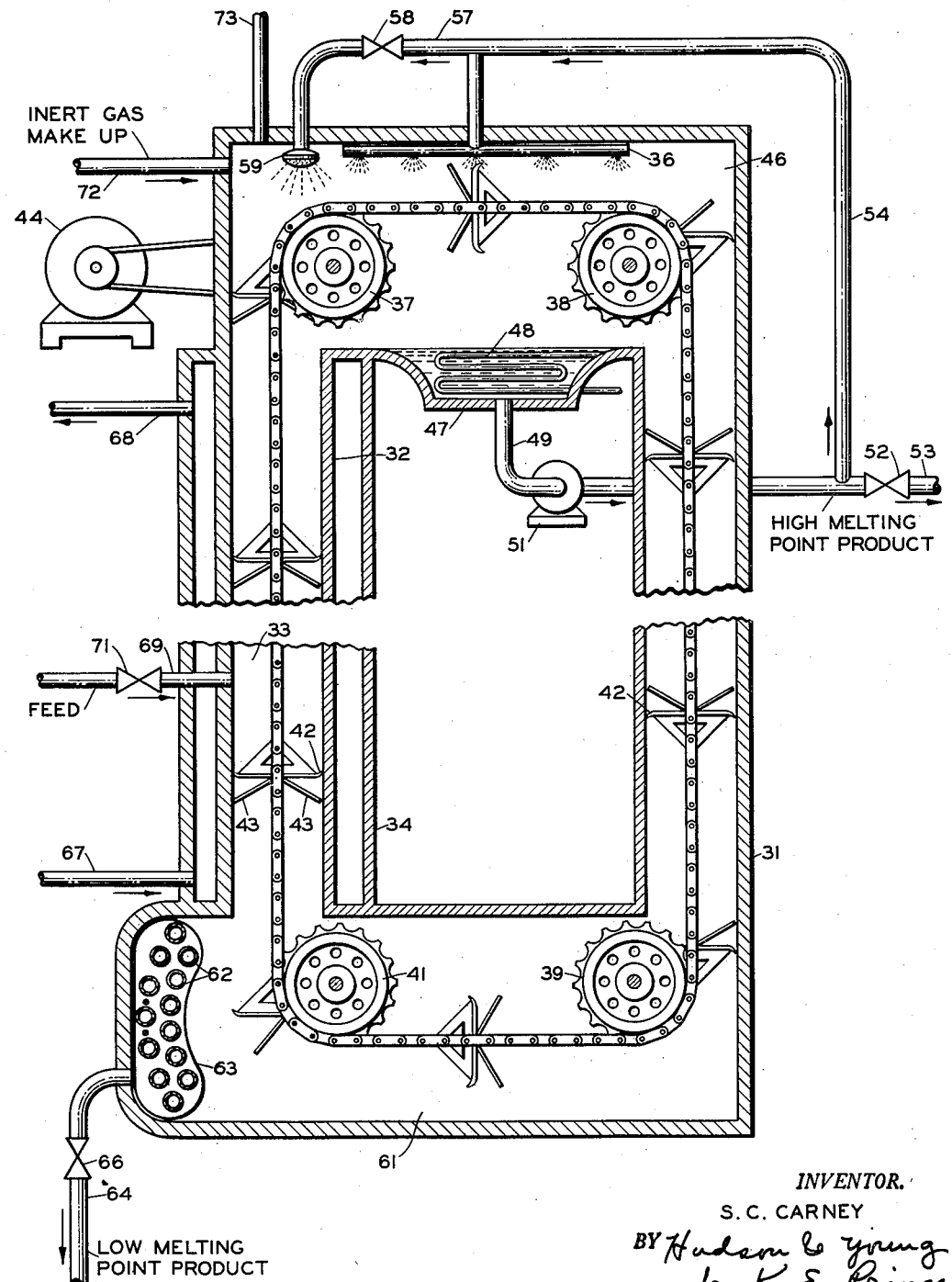
Figure 2 is a moving tray crystallizer which I use in removing the excess saturating component by crystallization.

In Figure 2, shell 31 forms the outer wall and inner shell 32 forms an inner wall. Space 33, between the outer and inner shells, is the separation zone of my apparatus and is surrounded by a jacket 34. An endless chain 56, which is moved through the apparatus by means of sprocket wheels 37, 38, 39, and 41 carries, at spaced intervals, perforate trays 42. Attached to the chain below each tray is a baffle 43. Motor 44 is provided for driving the sprocket wheel 37. In the bottom of upper horizontal space 46 is a melt tank 47 having a heater coil 48 therein. Conduit 49 leads from said melt tank to pump 51 which may move the melted liquid through valve 52 and conduit 53, or a portion of the melted liquid may be run through line 54 to sprays 36 and a further portion is sent through line 57 and valve 58 to spray 59 for use as a reflux liquid. In the lower horizontal portion 61, is a bank of cooling coils 62 which is provided with a scraper 63. Outlet line 64 leads from a lower portion of the lower horizontal section through valve 66 for removing lower melting fraction from the system. Inlet line 67 and outlet line 68 are provided for circulating a heat exchange medium through the cooling jacket 34. Feed material is introduced into the system through feed line 69 controlled by valve 71. Line 72 is provided for introducing an inert make-up gas into the enclosed system and line 73 is provided for removing gases from the system.

Figure 3:
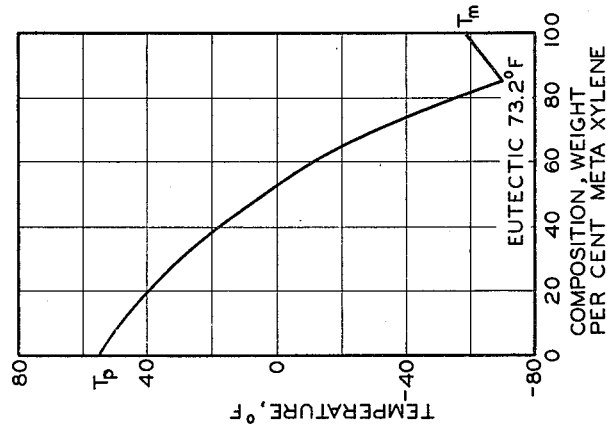
Figure 3 is a solid-liquid phase diagram for the system meta xylene-para xylene.

Figure 3 is a solid-liquid phase diagram for the system meta-para xylene, which shows the general form of the composition curve for the type of binary eutectic-forming mixtures which may be separated by my process and apparatus. In the diagram, $T_p$ represents the freezing point of pure para xylene and $T_m$ represents the freezing point of pure meta xylene. The eutectic temperature is the temperature at which the two curves meet.

Figure 4:
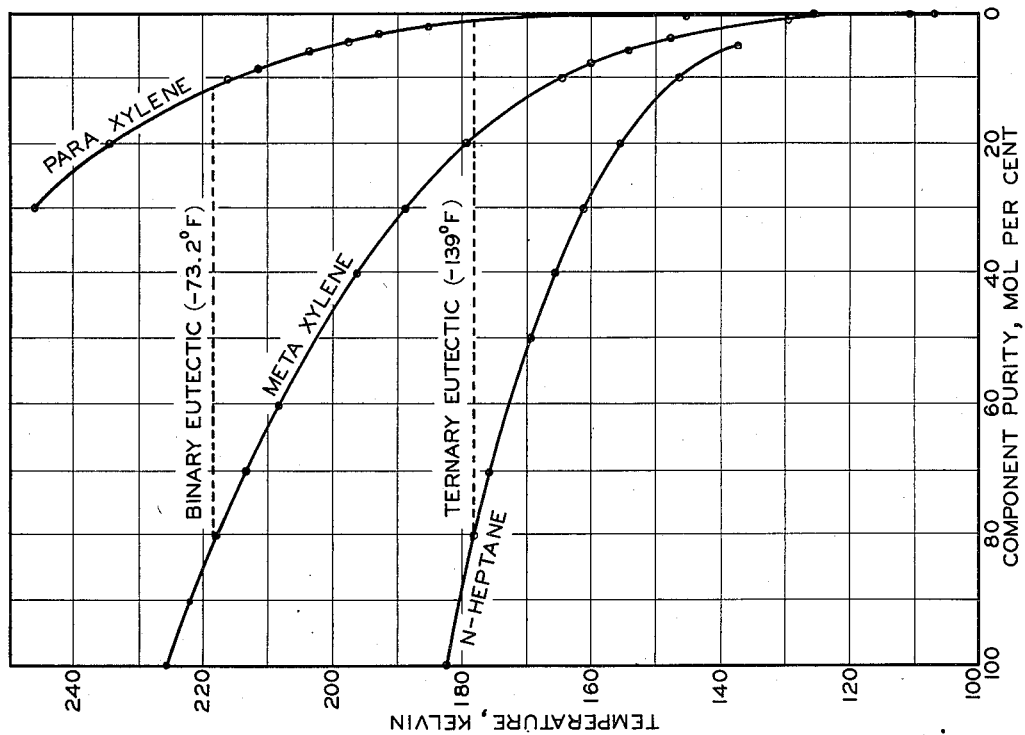
Figure 4 is a diagram of the freezing point curves showing the change of freezing point with the change in purity of the indicated compounds.

In Figure 4, the curves represent the change in freezing point of the indicated compounds with change in the mol per cent purity.

Figure 5:
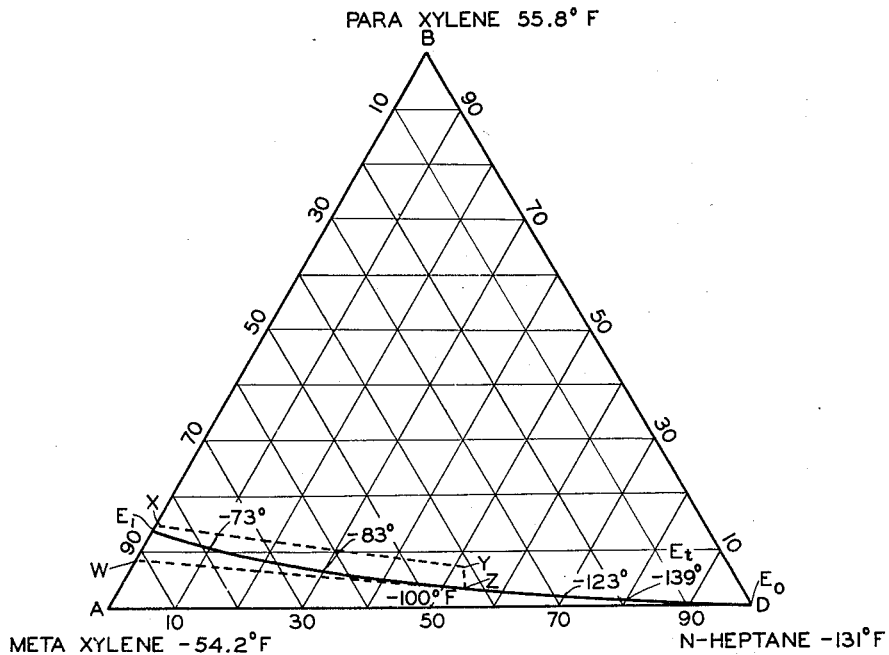
Figure 5 is a theoretical solid-liquid phase diagram for para xylene-meta xylene-n-heptane system.

In Figure 5, the eutectic composition for para xylene-meta xylene is represented by the point $E_1$, at which composition, the freezing point is about $-73.2°$ F. Line $E_1$—$E_t$—$E_0$ is the theoretical ternary eutectic curve with various freezing points indicated along the curve. Line XY represents the change in composition as increasing amounts of n-heptane are added to the mixture of meta and para xylene represented by X. Line YZ represents the change in composition of a ternary mixture as para xylene is removed from the mixture represented by point Y. Line ZW represents the change in composition of a ternary mixture having a composition Z as n-heptane is removed.

Figure 6:
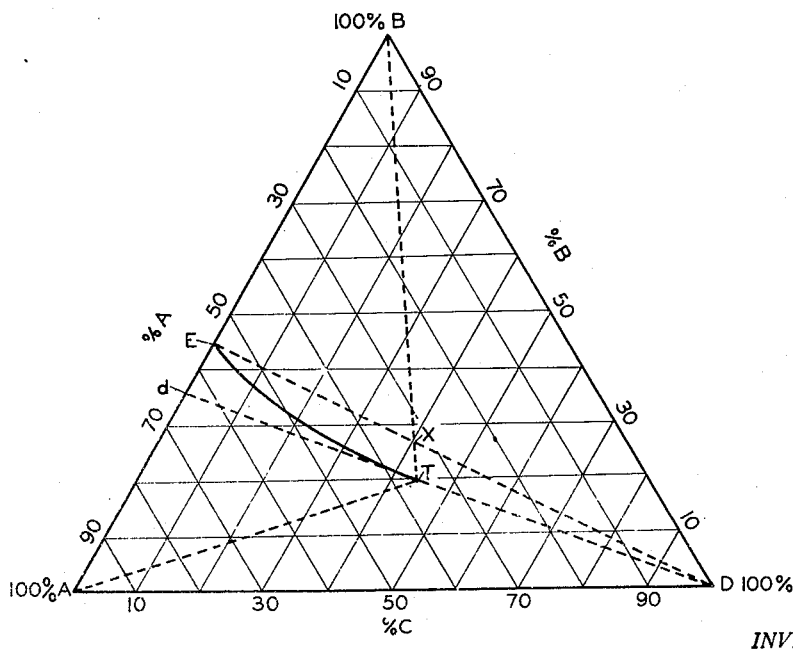
Figure 6 is a phase diagram for a three-component system showing the general system, according to the method of Gibbs.

In Figure 6, the vertexes of the triangle represent the indicated components in pure form. The amount of each component present in any given mixture is represented by the perpendicular distance of the point representing the mixture from the side opposite the vertex of that component. It is to be understood that point T represents any ternary system, the components of which are each saturated with respect to the others. Line ED represents the change in composition of a mixture as increasing amounts of D are added to a mixture represented by point E. Line D$d$ is a change of composition line passing through T. Curve ET represents a ternary eutectic curve where component D is the diluent. Point T represents the composition of the mixture when each component is saturated with respect to the other so that abstraction of heat solidifies a heterogeneous mixture of all three components. For any mixture whose composition falls within area ATE, the saturating component will be component A. If the ternary composition falls within area BTE, the saturating component will be B. Area EXT is the area within which the composition of the ternary mixture should fall at the time said ternary mixture is passed to the diluent removal zone. All points between E and T represent the binary eutectic for the ternary mixture.

Operation

The separation of a eutectic mixture by usual crystallization methods is impossible because at the eutectic composition, each component is saturated with respect to the other and abstracting heat from such a mixture results in the solidifying of both components simultaneously as a heterogeneous mass of crystals. If a third component which is completely miscible with each of the original components in the liquid state is added to the eutectic mixture, the freezing point of each of the original two components will be lowered, but the freezing point lowering will not be the same for each component. The freezing point lowering produced in each pure component by the addition of an impurity may be determined by Van't Hoff's equation which may be stated as follows:

$$-\ln X = \frac{\Delta H}{RT_0}\left(\frac{\Delta T}{T_f}\right)$$

where X equals the purity of the component in mol per cent; $\Delta H$ equals the molar heat of fusion; R equals the molar gas constant, 1,987 calories per degree mol; $T_0$ equals the absolute freezing point of the pure component; $T_f$ equals the absolute freezing point of the mixture; and $\Delta T$ equals $T_0 - T_f$. This equation may be rearranged as follows:

$$\log X = -\frac{\Delta H}{2.303\, RT_0}\left(\frac{T_0 - T_f}{T_f}\right)$$

The effect of the addition of a third component to a eutectic mixture may be calculated by using the Van't Hoff equation given in the preceding paragraph. Since the constants are different for each component, the freezing point lowering produced by the addition of a third component will not be the same for any two materials. The operation of my process depends upon this fact. By a series of approximations for each component, curves similar to those shown on Figure 4 may be constructed. If the Kelvin temperature is the ordinate and the component purity in mol per cent is the abscissa, the eutectic temperature for a binary mixture of the two components may be determined graphically as the temperature at which the combined component purity for the two components equals 100. In the case of para and meta-xylenes, the binary eutectic is approximately 218 K. or $-73.2°$ F. In determining the ternary eutectic temperature, it is necessary to determine the temperature at which the combined purity for the three components equals 100. In Figure 4, the ternary eutectic temperature is approximately 178° K. or $-139°$ F.

Another method of determining the eutectic compositions is to set up a modified Van't Hoff equation for each component and solve the equations simultaneously by approximation, i. e., assuming values for $T_f$ and solving for X in each equation. At the eutectic composition, the sum of the X's will be 1.0. However, the graphic method is simpler.

Since the addition of a third component lowers the freezing point of one component of a eutectic-forming mixture more than that of the other, that component whose freezing point is lowered the least will be the saturating component as the temperature of the ternary mixture is lowered. This saturating component will freeze from the solution in pure form (theoretically) until each of the two original components is saturated with respect to the other after which, further abstraction of heat will solidify a heterogeneous mixture of those two components. If each component is saturated with respect to the other two, abstraction of heat will freeze all three components as a heterogeneous mixture.

In practicing my invention, it is advantageous to construct for the particular system, the freezing point diagram similar to that shown in my Figure 4. The ternary eutectic point is the composition at which each of the three components is saturated with respect to the other two.

If the three component system of meta-xylene, para-xylene and a third diluent component is represented according to the method of Gibbs, as explained in Taylor's Treatise on Physical Chemistry, page 571 ff., the diagram shown in Figure 5 is obtained. The curve $E_1-E_t-E_0$ represents the composition of the material which will freeze if the starting mixture has a composition represented by $E_1$ and increasing amounts of the diluent are added. The temperatures shown are the freezing temperatures for the mixtures represented by each point. Curve $E_1$, $E_t$ of Figure 5 is a diagram for the particular system para xylene-meta xylene-n-heptane. $E_t$ represents the ternary eutectic point if n-heptane is used. However, if some other diluent is used, a similar diagram may be constructed for that particular system. $E_1$, $E_t$ will have the same shape regardless of the diluent used but $E_t$ will not fall at the same place on said curve. The curvature of the line $E_1-E_t$ is explained by the fact that the addition of a diluent does not produce the same freezing point lowering in the two components of the eutectic mixture. Having constructed the three-component phase diagram, it is possible to determine which component may be separated in each step of my process.

In any system, if a straight line is drawn connecting point E with the opposite apex of the triangle, which represents 100 per cent diluent, as shown in Figure 6, point T will fall on the side of line ED representing an excess above the binary eutectic ratio of that component whose freezing point is affected the least by the diluent addition. As a general rule, it can be said that the component having the greater cryscopic constant will show the least freezing point lowering. The cryscopic constant (A) is equal to $$\frac{\Delta H}{RT_0^2}$$

where $\Delta H$ equals the molar heat of fusion; R equals the molar gas constant, 1,987 calories per degree mol; and $T_0$ equals the freezing point of the pure component.

While the diagram of Figure 5 shows the composition of the ternary mixture if normal heptane is used as the diluent, any other diluent which is completely miscible with the original components may be used. The only difference will be that the ternary eutectic composition, here represented by $E_t$ will fall at some point along the curve $E_1-E_t-E_0$, where $E_0$ is the limiting case. In the diagram of Figure 5, D represents 100% component D and point $E_0$ could never coincide with D because the ternary eutectic curve is projected thereon. However, for the purpose of explaining my invention, point $E_0$ is so close to D on a two dimensional diagram that they appear to coincide. It would never be practical in actual operations to approach the composition represented by $E_0$. The curve of $E_1$—$E_t$—$E_0$ of Figure 5 is the theoretical ternary eutectic curve for meta-xylene-para xylene and all ternary eutectic points will fall thereon. This shape of the curve is determined by the physical properties of the xylenes alone and is independent of third component.

If, in Figure 6, a straight line is drawn between A and T and another between B and T, the points falling within triangle ATB represent compositions which on cooling will become saturated with either A or B depending on whether or not the point is within the area AET or BET. In carrying out my process, care must be exercised that the composition of the mixture never falls outside the area ATB. Otherwise, the diluent will be the saturating component and no separation will occur between the components of the original mixture. The amount of diluent added must alway be less than the amount necessary to produce the ternary eutectic, represented by point T in Figure 6.

The operation of my process will be more clearly understood from a discussion of the steps that would be performed in separating a 50–50 mixture of meta and para-xylenes. The freezing points of pure components are about 55.8° F. for the para isomer and about —54.2° F. for the meta. The binary eutectic melts at —73.2° F. and is made up of approximately 85.7 per cent meta xylene and 14.3 per cent para xylene. In explaining my continuous process, I shall use a feed rate of 100 pounds of mixed xylenes per hour. When the term "excess saturating component" is used, it is to mean that portion of the saturating component in excess of the amount required to saturate the saturated component or components.

The feed is introduced into crystallizer 12 of Figure 1 where a portion of the saturating component is frozen on the upwardly moving trays of the crystallizer. The temperature at the top of the crystallizer is maintained slightly below the freezing point of the saturating component which, in this case, is para xylene, which has a freezing point of about 55.8° F. The temperature at the bottom of the crystallizer is maintained slightly above the freezing point of the eutectic mixture which, in this case, is approximately —73.2° F. The operation of the moving tray crystallizer is fully described in my copending application, Serial No. 68,461, filed December 31, 1948. The solidified portion of the feed is moved upward through the crystallizer where it is continuously contacted with portions of reflux liquid having a higher content of para xylene than the solid being contacted. Each solid-liquid contact causes a portion of the solid to melt, and at the same time, a portion of the liquid to freeze. This results in a solid of higher purity with respect to para xylene than the original solid before contact with the reflux liquid. By carrying out a sufficient number of the solid-liquid contacts, the solid reaching the top of the crystallizer is substantially pure para xylene. After the solid leaves the crystallizer, it is melted and a portion of the liquid melt is returned to the top of the crystallizer as reflux, the exact amount of reflux being varied as desired to meet the specific operating requirements. As the reflux liquid flows downward through the crystallizer, it approaches the eutectic composition and the liquid collecting in the bottom of the crystallizer is substantially pure eutectic. For each 100 pounds of feed introduced into the crystallizer, approximately 41 pounds of pure para xylene can be removed overhead through line 13 if the first separation is carried to within about 1 per cent of the eutectic composition. The eutectic mixture is then passed into mixer 16 where it is mixed with approximately 128 pounds of normal heptane per 100 pounds of original feed. This produces a ternary mixture having a composition represented by Y of Figure 5. This mixture is then passed into crystallizer 19, which is similar to crystallizer 12, where the temperature is reduced to about —105° F. Since, as shown in Figure 5, the para isomer is the saturating component in the ternary mixture, an additional amount of para xylene can be removed from the top of crystallizer 19 through line 21. The removal of this additional amount (about 9 pounds per hour) of para xylene causes the composition of the mixture to change along the line YZ. The temperature at the top of crystallizer 19 is maintained slightly below the melting point of para xylene and the temperature at the bottom is maintained at approximately the temperature at which the eutectic begins to crystallize from the ternary mixture. The maximum amount of para xylene that can be removed is represented by the line YZ and the lowest temperature to which it can be cooled without freezing the eutectic is about —105° F. The mixture leaving the bottom of crystallizer 19 has a composition represented by Z in Figure 5. This mixture is passed to distilling zone 23 where the n-heptane diluent is removed as an overhead product and is returned to the mixing zone through lines 24 and 17. The effluent from the bottom of distilling zone has a composition represented by the point W on line AB of Figure 5. In this case, the mixture contains about 92 per cent meta xylene and 8 per cent para xylene. It is seen that the eutectic point has been passed and that meta xylene has now become the saturating component. The binary mixture is then passed into crystallizer 27 wherein the temperature at the top is maintained slightly below the melting point of pure meta xylene (—54.2° F.) and the temperature at the bottom is maintained slightly above the freezing point of the eutectic composition as in the first crystallizer 12. Distance WE, along AB of Figure 5 represents the theoretical amount of meta xylene that may be removed as the excess saturating component. However, this composition can only be approached but not reached. This leaves a bottoms product which closely approximates the binary eutectic composition. The amount of meta xylene so removed is about 50 pounds per hour. The bottom product is removed through line 29 and is recycled to the mixer along with the bottom product from crystallizer 12. The amount of recycle eutectic is approximately 60 pounds per hour.

These figures represent the amounts that can be removed in each stage after the system has reached a steady state. The amount of para xylene that can be removed per hour by crystallizer 12 is constant from the first cycle. However, the amount of para xylene that can be removed by crystallizer 19 increases from about 4.5 pounds per hour for the first cycle to a constant amount of about 9 pounds per hour after the system has reached a steady state, about the seventh cycle. This is caused by the increase in the amount of recycle eutectic from about 31.5 pounds per hour to a steady 61 pounds per hour.

Let us now consider the application of my invention to the general case represented by Figure 6. The addition of a diluent to the binary eutectic of Figure 6 may produce a ternary mixture which falls on the side of the ternary eutectic curve ET opposite the starting point. This occurs when the composition of the starting mixture falls along line AE. When this situation exists, it is desirable to remove enough of component A in the first crystallizer so that by addition of the diluent, the composition of the ternary mixture can be made to fall within the area EXT. It is desirable to approach line ET as closely as possible in each crystallization. When the dilution lines connecting any point along AB with vertex D crosses the eutectic curve ET, the saturated component becomes the saturating component and the eutectic point has, in effect, been by-passed. After the excess saturating component has been removed in the second crystallizer and the diluent has been removed in the distilling zone, the composition of the binary mixture will fall somewhere along line dE. It is preferable that the composition fall as close as possible to point d to permit the removal of the maximum amount of component A in the next step.

If the composition of the starting mixture falls along line AE, component A will be removed in the first crystallizer, component B will be removed in the second crystallizer, and the bottom product of the distilling zone will be saturated with respect to component A. This bottom product can be passed from the distilling zone to the first crystallizer. In adding the diluent to the bottom product of the first crystallizer 12, it is preferable that the composition of the ternary mixture fall at a point farther away from line ET than the distance between the point representing binary mixture entering mixer 16 and point E as measured along line AE. The distance of the ternary composition from line ET is measured along an extension of the straight line connecting vertex B with the point representing said ternary composition. This line is actually the change of composition line when component B is being removed from the ternary mixture.

If the starting mixture has a composition represented by a point along line BE, the saturating component is component B. It is desirable that the maximum amount of component B be removed in the first crystallizer. Under these circumstances the ternary mixture as it enters crystallizer 19 will be saturated with component B but the composition will fall within area EXB. If the maximum amount of component B has been removed in crystallizer 12, the ternary composition will fall near line EX. This means that the amount of ternary mixture which must be handled will be held to a minimum. In this system, component B is removed in both the first and second crystallization steps. The third crystallizer must be used for the removal of component A and the bottom product of said third crystallizer is recycled to the mixer 16.

My invention is almost "fool-proof" as a method for resolving a mixture of eutectic-forming components, but there are three critical operating conditions. The temperature at the top of each crystallizer must be held sufficiently near the melting point that material of less than the desired purity will melt before reaching the top and material having the desired purity will remain solid and pass out the top. The amount of diluent added must never be enough to produce a ternary mixture falling outside area ATB of Figure 6 herein. This would make component D the saturating component of the ternary mixture. When the diluent is added to the binary mixture, the composition of the ternary mixture must not fall on line ET. If this should happen, nothing could be removed overhead from crystallizer 19 and the bottom product from distilling zone 23 would be the same as the bottom product of crystallizer 12. If this should accidentally occur, it would result in an unnecessary amount of recycling but would not be fatal to the process.

Certain other conditions, while not critical, are desirable in the interest of efficient operation of the process. It is desirable that substantially all of the saturating component in excess of the eutectic ratio be removed in each step. It is desirable that all of the diluent be removed in the distilling zone. It is desirable that sufficient diluent be added to yield a ternary mixture which lies a greater distance from the ternary eutectic curve than the binary mixture before diluent addition is from point E, said distances being measured along the respective change of composition lines representing removal of the saturating components for each mixture. It is highly desirable that the composition of the ternary mixture after removal of the excess saturating component fall within area EXT and as near line ET as practicable.

Failure to maintain the "desired" conditions will not be "fatal" to the process. It may result in unnecessary recycling of materials but continued recycling will eventually effect the desired separation. Failure to maintain the first two of the critical conditions would be fatal to the process since it would permit removal of material other than pure A or B from the system. Failure to maintain the third would result is no separation.

The choice of diluent to use is not critical except that it should be one whose freezing point is lower than the freezing point of the binary eutectic. Such components effect greater alteration of the binary eutectic composition before reaching the ternary eutectic composition. They are also easily removed by distillation. This permits the addition of sufficient diluent to produce a ternary composition from which the maximum amount of the saturating component can be removed. It is neither practicable nor desirable to cool the mixture to the ternary point. The alteration of the binary eutectic composition may be less when the cooling is stopped short of the ternary eutectic temperature but the refrigeration costs are less. An economic balance will determine the optimum crystallization temperature. In the selection of a diluent, it is necessary that the boiling point of the diluent be sufficiently different from the mixture of the two original components to permit its separation in the distilling zone. Examples of diluents are $C_2$ to $C_{10}$ paraffins and cycloparaffins, aromatic and aliphatic alcohols, such as phenol, xylenols, cyclohexanol, propanol, methanol and butanol, benzene, substituted benzenes, ethers, substituted ethers, ketones, aldehydes, amines, and alkyl and aryl halides.

While I have explained my invention as a method for separating meta and para xylenes, my process is equally useful in any other system of binary mixtures the components of which are completely miscible in the liquid phase and completely immiscible in the solid phase. Other examples of eutectics are cis and trans butene-2; benzene and normal hexane; durene and isodurene; acetone and benzene; anilin and benzol; diphenylamine and diphenyl ether; ethyl acetate and nitrobenzene; naphthalene and α naphthalamine. Numerous others are listed in Landolt-Börnsteins's Physikalisch-Chemische Tabellen, 5th ed., 3d supplement, 1st division, pages 563–583. My invention is applicable to any eutectic-forming system whose components are not decomposed by melting.

It is obvious that my invention is not limited to the specific systems enumerated but may be used in the separation of any binary mixture whose miscibility characteristics are as described. I do not limit my process to the particular solvents listed but numerous other solvents may be employed. My invention is limited only by the following claims:

Having described my invention, I claim:

1. A process for separating the components of a binary mixture of organic compounds which form a binary eutectic and which are completely miscible in the liquid phase and completely immiscible in the solid phase which comprises the steps of passing the liquid mixture containing an excess of a saturating component into a first elongated separation zone; maintaining the bottom of said first separation zone at a temperature above the eutectic temperature for the binary mixture and below the top temperature, maintaining the top of said first separating zone at a temperature such that the saturating component of less than the predetermined purity will be melted before reaching the top and material of the desired purity will remain solid at the top, and maintaining the intermediate temperatures at points intermediate the top and bottom of said first separation zone; abstracting heat from said mixture to solidify a portion of said mixture; passing said solid upward through said first separation zone, subjecting the upwardly-moving solid to a plurality of solid-liquid equilibrium contacts with a liquid which is increasingly richer with respect to the saturating component of said binary mixture, whereby the solid is made increasingly richer with respect to said saturating component as it approaches the top of said first separation zone and the descending reflux liquid is made to approach the binary eutectic composition as it descends; removing the solidified saturating component as overhead product, the amount of said saturating component removed as a solid overhead product being sufficient that the addition of a diluent to the remaining liquid will produce a ternary mixture having a greater excess of saturating component than the binary mixture to which said diluent was added; removing a mixture approximating the binary eutectic composition as a liquid bottom-product; adding to the liquid bottom product a liquid diluent in an amount less than that required to saturate the resulting ternary mixture with respect to said diluent but sufficient to permit crystallization of a quantity of the component with respect to which said ternary mixture is saturated, said liquid diluent being such that the freezing point of one of the components of said liquid bottom-product is lowered more than the other; passing the ternary mixture so formed into a second separation zone; abstracting heat from said mixture to solidify a portion of the then saturating component; passing the solid upwardly through said second separation zone while subjecting it to a plurality of solid-liquid contacts with a reflux liquid which is increasingly richer with respect to the saturating component of said ternary mixture; removing the solidified material overhead and removing the remaining liquid from the bottom of said second separation zone; removing the diluent from the bottom product; passing the diluent-free liquid to a separation zone; abstracting heat from said liquid to solidify a portion of the saturating component; passing the solid upwardly through said last-named separation zone while subjecting it to a plurality of solid-liquid contacts with a reflux liquid that is increasingly richer with respect to the component with respect to which said mixture is saturated; removing the solidified material as a solid overhead product and the liquid of near eutectic composition as a liquid bottom product, in the manner described for the first separation; and recycling the last-named liquid bottoms product.

2. The process of claim 1 wherein the reflux liquid for each step is obtained by melting a portion of the overhead product and returning it to an upper portion of the separating zone from which it was removed.

3. A process for separating a binary eutectic mixture of organic compounds which comprises: adding a diluent to said mixture, said diluent being such that freezing points of individual components present in said binary eutectic mixture are lowered to a different degree; passing a resulting ternary mixture into a separation zone; removing heat from said resulting ternary mixture to solidify a portion of said mixture; passing resulting solid upward through said separation zone while subjecting it to a plurality of solid-liquid contacts with a reflux liquid; removing resulting solidified material overhead from said separation zone as a product of the process; and removing a resulting liquid material from the lower portion of said separation zone.

4. The process of claim 3 wherein said diluent is added in an amount less than a quantity required to saturate said resulting ternary mixture with said diluent but at least enough to produce an excess of a component over that required to saturate said resulting ternary mixture with said component present from said binary eutectic mixture, and wherein said reflux is increasingly richer with respect to said saturating component.

5. A process for separating a binary eutectic mixture of organic compounds, which comprises: adding a diluent miscible with said mixture in an amount less than that required to saturate a resulting ternary mixture with respect to said diluent but sufficient to permit crystallization of a quantity of a component with respect to which said resulting ternary mixture is saturated, and lowering individual freezing points of said components present from said binary eutectic mixture to a different degree; passing said resulting ternary mixture into a first separation zone, removing heat from said mixture, and solidifying a portion of said saturating component; passing resulting solid upwardly through said first separation zone and subjecting it to a plurality of solid-liquid contacts with a reflux liquid in discontinuous phase which liquid is increasingly richer with respect to said saturating component of said resulting ternary mixture; removing resulting solidified material overhead from said first separation zone as a product of the process and removing a resulting liquid material from the lower portion of said first separation zone; removing diluent from said resulting liquid material and passing resulting diluent-free material into a second separating zone; abstracting heat from said resulting diluent-free material and solidifying a portion of a saturating component; passing resulting solid upwardly through said second separation zone and subjecting it to a plurality of solid-liquid contacts with a reflux liquid which is increasingly richer with respect to a saturating component with respect to which said resulting diluent-free material is saturated; removing resulting solid material overhead from said second separation zone as a product of the process; and removing a resulting binary eutectic material from the lower portion of said second separation zone and recycling same to said diluent adding operation.

6. The process of claim 5 wherein said reflux liquid for each step is a melted portion of said overhead product returned to the upper portion of said separation zone from which it was removed.

7. The process of claim 3 in which said resulting solid is passed upwardly through said separation zone in separate vertically spaced-apart masses and said reflux liquid is maintained in discontinuous phase so that reflux liquid gravitates successively over said masses.

8. The process of claim 7 in which said reflux liquid as first introduced into contact with said solid is a portion of said product.

9. The process of claim 3 in which said reflux liquid as first introduced into contact with said solid is a portion of said product.

SAMUEL C. CARNEY.

REFERENCES CITED

The following references are of record in the file of this patent:

UNITED STATES PATENTS

| Number | Name | Date |
|---|---|---|
| 1,301,388 | Conover | Apr. 22, 1919 |
| 1,348,409 | Gumwood | Aug. 3, 1920 |
| 1,576,137 | Johnson | Mar. 9, 1926 |
| 1,917,822 | Britton | July 11, 1933 |
| 2,147,222 | Treub | Feb. 14, 1939 |
| 2,293,676 | Myers | Aug. 18, 1942 |
| 2,398,526 | Greenburg | Apr. 16, 1946 |
| 2,402,158 | Glowacki | June 18, 1946 |
| 2,425,335 | Messing et al. | Aug. 12, 1947 |
| 2,435,792 | McArdle | Feb. 10, 1948 |
| 2,470,116 | Swietoslawski | May 17, 1949 |